Figure 1:
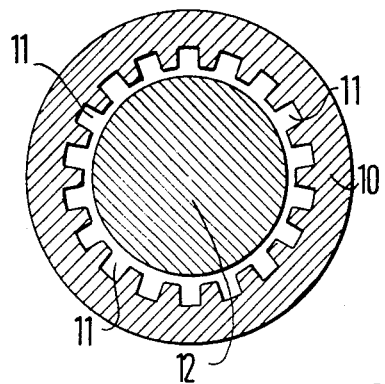

United States Patent [19]
Chalmers et al.

[11] 3,757,182
[45] Sept. 4, 1973

[54] SYNCHRONOUS ELECTRICAL MACHINES

[75] Inventors: Brian John Chalmers, Bramhall, England; Razvan Matei Magureanu, Bucharest, Romania

[73] Assignee: National Research Development Corporation, London, England

[22] Filed: Dec. 8, 1971

[21] Appl. No.: 206,051

[30] Foreign Application Priority Data
Dec. 11, 1970  Great Britain.................. 59,168/70

[52] U.S. Cl..................... 318/186, 310/41, 310/210
[51] Int. Cl. .............................................. H02p 1/46
[58] Field of Search............................ 310/41, 210; 318/182, 186, 174, 177, 237

[56] References Cited
UNITED STATES PATENTS
2,969,491   1/1961   Pell..................................... 318/182
3,173,071   3/1965   Lee..................................... 318/186

Primary Examiner—Gene Z. Rubinson
Attorney—Cushman, Darby and Cushman

[57] ABSTRACT

Brushless synchronous electric machines are described in which the rotor is excited by rectifying a.c. induced in a rotor winding. Current flowing in the stator winding sets up a magnetic field with a main component and a subsiduary component. In operation the rotor rotates at the speed of the main component and the a.c. which is rectified, is induced by the subsiduary component. The subsiduary component may be set up for example by a stator-rotor air-gap whose permeance varies with angular position or by supplying the stator from a non-sinusiodal supply, but an additional stator winding is not required.

24 Claims, 16 Drawing Figures

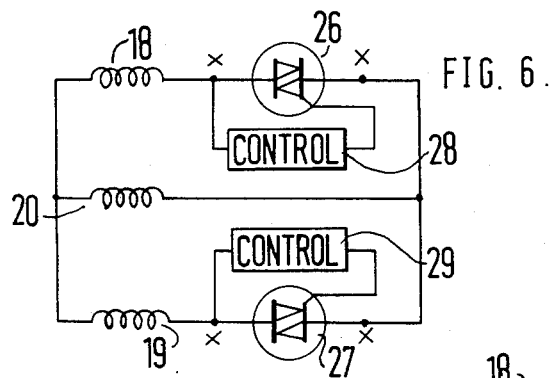
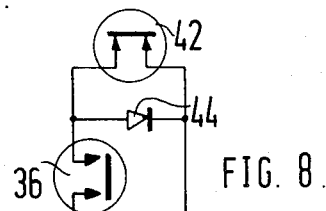
FIG. 6.
FIG. 8.
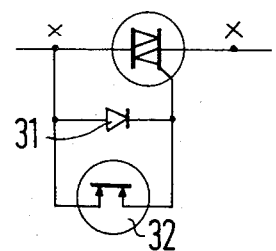
FIG. 7.
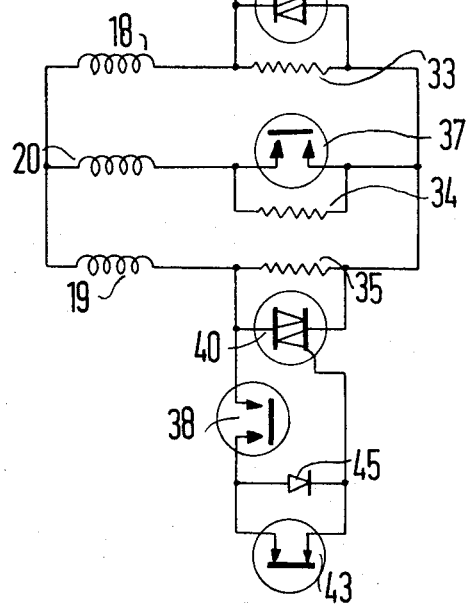
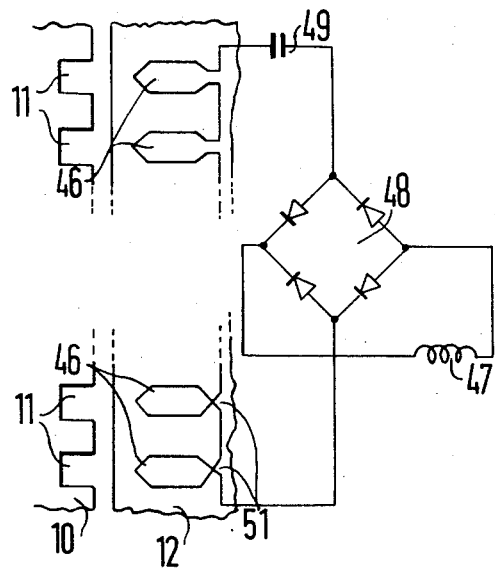
FIG. 9.

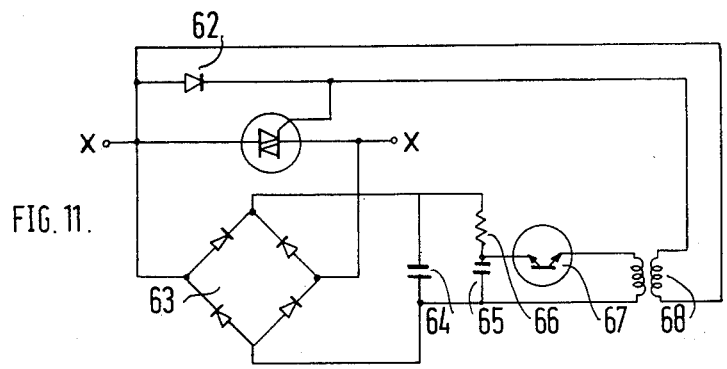
FIG. 11.
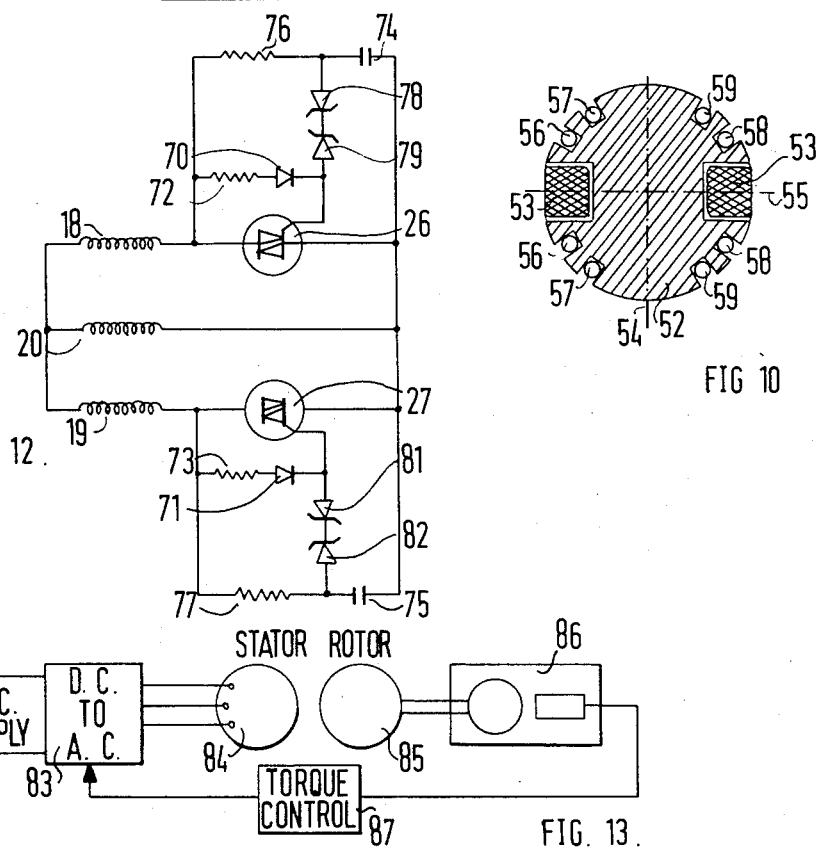
FIG. 12.
FIG 10
FIG. 13.

SYNCHRONOUS ELECTRICAL MACHINES

This invention relates to synchronous electric machines in which the main working magentic field is excited by the flow of direct current in a winding. This excitation winding is situated in the rotor of the machine and the main working alternating currents are carried by windings situtated in the stator of the machine.

Hitherto in synchronous electric machines the direct current has commonly been supplied to the excitation winding by way of brushes and slip-rings.

According to the present invention there is provided an electrical machine including a stator with a stator winding wound primarily to provide, when supplied with alternating current, a magnetic field having a main component field with a predetermined number of poles rotating with respect to the stator about an axis the stator having no further winding wound primarily to provide another magnetic field with a different number of poles, from the predetermined number, a rotor mounted to rotate about the said axis, having a rotor winding wound to provide, when supplied with direct current, the same number of magnetic poles for the rotor as the main component field, and rectifier means mounted on the rotor for causing direct currents to flow in the rotor winding by rectifying currents induced in the rotor winding or a further rotor winding by a subsiduary component of the said magnetic field, at least when the rotor speed is the same as, or is near to, the rotational speed of the said main component magnetic field.

Induction of a.c. in the rotor for rectification to provide d.c. for energising the rotor winding may be achieved by using a stator such that the air-gap permeance between the stator and the rotor varies with angular position relative to the stator. Then as the stator field revolves it pulsates providing a subsiduary component field which induces a.c. in the rotor winding or one of the rotor windings. Instead the stator may be supplied from a source whose output waveform is non-sinusoidal, that is simultaneously composed of two or more a.c signals at different frequencies. This has the effect of providing a magnetic field with a main component field rotating at a speed dependent on the repetition frequency of the supply and one or more subsidiary component fields. The subsidiary fields rotate at speeds which are multiples of the main component field speed and thus when the rotor rotates at the main component field speed, the subsidiary component fields induce currents in the rotor windings.

Such an excitation system has many advantages. For example, it does not require the collection of its excitation current through sliding contacts nor does it require the provision of a separate exctiation machine or a separate source of direct current for its excitation. Synchronous electric machines incorporating the new excitation system may have advantages of higher power output, higher power factor and higher efficiency than some other forms of brushless synchronous motors. They may also have the advantage that the power factor may be arranged to take either lagging (inductive) or leading (capacitive) values.

Furthermore the use of additional stator windings with different numbers of poles from the main stator and rotor windings to induce currents in a rotor winding is avoided.

In the specification, a rotating magnetic field or a rotating component field, as applied to a stator with an associated rotor, means not only a field or a component field which rotates with respect to the stator but also includes a pulsating field or a pulsating component which would (at least on its own) tend to rotate the rotor (when excited if necessary).

Motors according to the invention are usually devised to start as induction motors, devices sensitive to rotor speed, such as centrifugal switches or speed-sensitive circuits being mounted together with rectifiers on the rotor, to rectify induced currents when a speed near synchronous speed, say 95 percent of synchronous speed, has been reached. In addition rotors may include a cage winding for starting.

Advantageously the rotor includes a stack of laminations of ferromagnetic material and may be of substantially circular cross-section. Otherwise the cross-section of the core may be arranged to form a number of salient poles equal to the number of magnetic poles produced by the main alternating currents flowing in the stator. Otherwise the core may be arranged so as to exhibit effective magnetic saliency by virtue of internal flux barriers as it is known to include in synchronous reluctance motors. By including either of these forms of saliency, higher power output may be obtained.

The winding on the rotor may take the form of a conventional type of polyphase winding. Otherwise it may take the form of either a single-phase winding or a single coil wound on each of the salient poles.

The main air-gap of the machine, that is to say the radial distance between the stator and rotor core surfaces facing each other, may be arranged to be somewhat greater than the air-gap commonly arranged in induction motors. For example, it may be in the approximate range of two to five times greater. This increase of the air-gap increases the power output which may be produced by synchronous electric machines incorporating the new excitation system. Since the air-gap of a 5kw induction motor is about 0.02 inches, the gap for machines according to the invention is for this size of machine, advantageously between 0.04 inches and 0.1 inches.

Motors according to this invention can be operated at a fixed synchronous speed by connecting the stator winding to a fixed frequency supply, or at variable speed by using a frequency converter or other variable frequency supply.

Most of the conventional forms of stator construction may be used as may most forms of multiphase or single-phase stator windings.

Machines according to the invention can be used either as motors or as generators.

Figure 3:
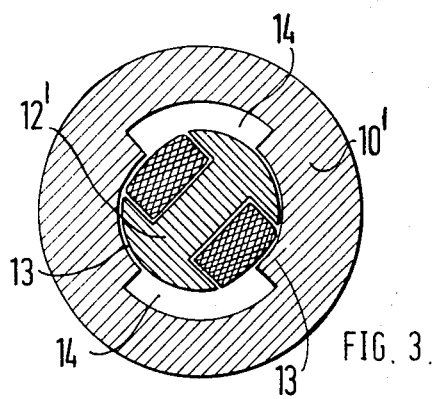
Figure 2A:
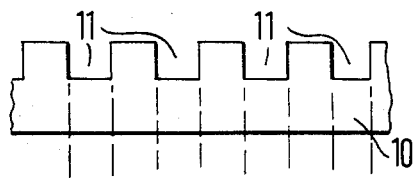
Figure 2B:
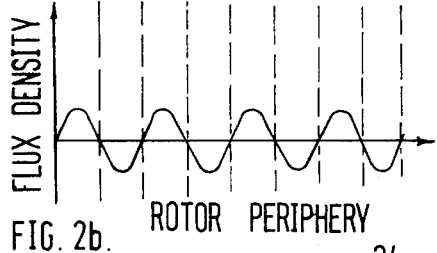
Figure 4:
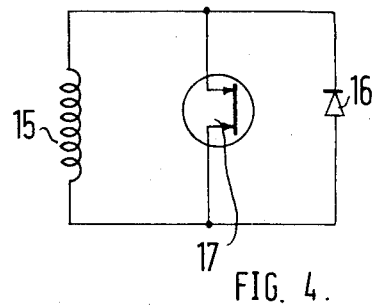
Figure 5A:
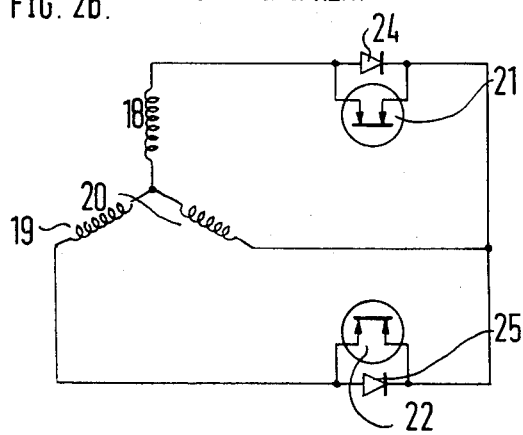
Figure 5B:
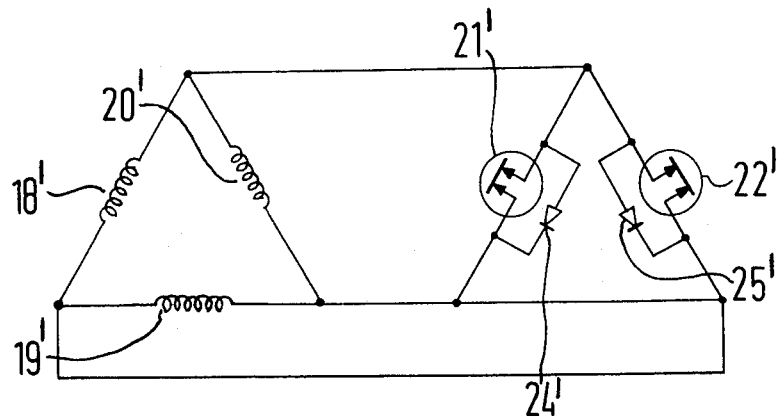
Figure 14:
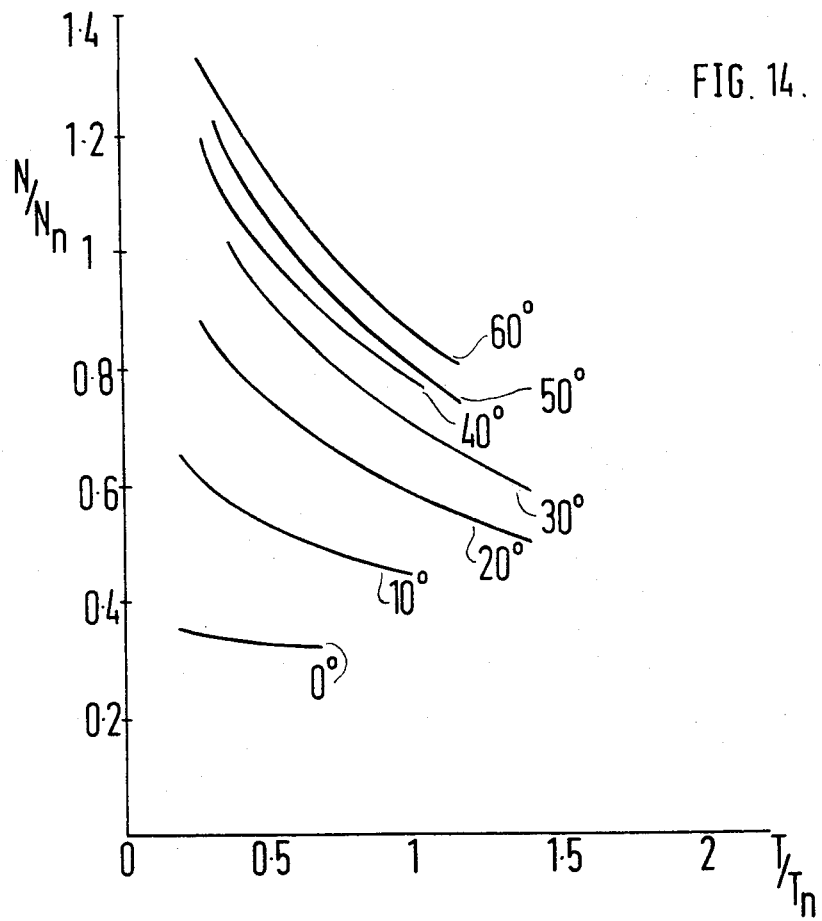

Certain embodiments of the invention will now be described with reference to the accompanying drawings, in which:

FIG. 1 shows a cross-section through the stator core of a machine according to the invention, FIG. 2a is a developed view of the stator core of FIG. 1, FIG. 2b shows flux variations which are caused by the slots in the stator, FIG. 3 shows a schematic cross-section of another machine according to the invention, FIG. 4 is a circuit diagram including a single-phase rotor winding for a machine according to the invention, FIG. 5a is a circuit diagram including a three-phase star-connected rotor winding for a machine according to the invention, FIG. 5b is a circuit diagram including a three-phase delta-connected rotor winding for a machine according to the invention, FIG. 6 is a circuit diagram including a three-phase rotor winding and a control circuit for a machine according to the invention, FIG. 7 is a circuit diagram showing a first control circuit which may be used in the circuit of FIG. 6, FIG. 8 is a circuit diagram including a three-phase rotor winding and a further control circuit for a machine according to the invention, FIG. 9 shows a rotor winding for a motor having the stator core of FIG. 1, FIG. 10 shows a cross-section through the rotor of a motor to be supplied from a non-sinusoidal supply, FIG. 11 is a circuit diagram for a second control circuit for the circuit of FIG. 6, particularly suitable for use with a motor supplied from a variable frequency supply, FIG. 12 is a circuit diagram of a three-phase rotor winding and a further control circuit suitable for use with a motor supplied from a variable fequency supply, FIG. 13 is a block diagram of a circuit, including a motor according to the invention, having a characteristic similar to that of a series motor, and FIG. 14 shows characteristics of the arrangement of FIG. 13.

In FIG. 1 the stator core 10 of a synchronous motor has a number of slots 11 for conductors (not shown) of the stator winding. The conventional stator winding for synchronous machines is used. With this type of stator core and winding the slots cause variations in the permeance of the magnetic paths between the stator and a rotor 12, shown in outline only, which may or may not have salient poles. Thus as the rotor rotates any one part of the rotor experiences a variation of flux-density as shown in FIG. 2b superimposed on the main working flux-density. Each slot of FIG. 2a causes a corresponding variation in flux-density due to the different permeance of flux paths including and excluding slots.

Thus as the rotor rotates at synchronous speed its windings experience a flux pulsation which induces curents in the windings.

Another flux variation is caused by the current in the stator windings flowing in discrete conductors rather than flowing in a hypothetical distributed conductor spread homogenously round the stator. In other words each conductor provides an intensification of flux-density in its immediate vicinity which causes the rotor periphery to experience flux pulsations as it rotates at synchronous speed. Rotor currents are also induced by flux pulsations arising in this way.

The amplitude of current induced in the rotor winding depends on the number of slots in the stator, the width of the stator slot openings and the length of the air gap, and these factors must be chosen with the required rotor excitation in mind. Although the number of stator slots can be substantially the same as for an induction motor there is some advantage in increasing the number slightly, since this increases the frequency of the flux pulsation. For example, for a 5kw machine with three phases and four poles, the number of slots could be 36 or 48. The most important parameter is the width of the slot opening. The ratio slot opening to air gap length should be typically 10 to 15 with an approximate range of seven to 20.

Another way in which the permeance of the flux path can be varied with angular position is shown in FIG. 3 where the stator core 10' has two pairs of opposite sectors with different air-gaps 13 and 14. The gaps 13 are conventional, that is typically approximately 0.020 inches for a 5kw machine, while the gaps 14 are typically from five to ten times larger and exceptionally from two to 25 times larger. As a rotor 12' turns each flux path experiences changes in permeance due to the different gap sizes with consequent change in flux. Hence again currents are induced in the rotor windings.

In FIG. 3 the stator winding is conventional for a synchronous machine and located in uniformly spaced slots. The rotor may have or may not have salient poles.

In one embodiment of the invention the motors of FIGS. 1 and 3 include the circuit of FIG. 4 to control currents in a single-phase rotor winding 15 of the type used in a conventional synchronous motor. The motor starts by induction-motor action with a.c. induced and flowing in the rotor winding, a rectifier 16 being short circuited at this time by a centrifugal switch 17. When the speed rises to the point where the rotor can pull into synchronism, the switch 17 opens, the rectifier 16 rectifies currents induced by the pulsating flux such as that of FIG. 2b, exciting the rotor winding with d.c., and the motor functions as a synchronous motor.

In one embodiment of a three-phase motor the circuit for the rotor windings has three star connected rotor windings 18, 19 and 20 (FIG. 5a) of conventional type for a three-phase induction motor, with or without salient poles. As before the motor starts by induction motor action when the centrifugal switches 21 and 22 are closed but becomes a synchronous motor when the centrifugal switches open allowing rectifiers 24 and 25 to rectify currents induced by the flux pulsation in the windings 18, 19 and 20.

In FIG. 5b a delta connected rotor windings 18', 19', and 20' are used instead of the star-connected windings of FIG. 5a. Centrifugal switches 21' and 22' and rectifiers 24' and 25' perform in a similar manner to the switches 21 and 22, and the rectifiers 24 and 25. Advantageously the winding 19' is of higher resistance, for example five times higher, than that of the winding 18' or 20'. Thus the starting torque is increased making the motor suitable for operation from a fixed freqiency supply. Synchronous operation is not affected, since the d.c. rotor current does not pass through the winding 19'.

A further rectifier, oppositely poled to the rectifiers 24 and 25, and centrifugal switch may be connected in series with the winding 20 but it is preferable to omit these further components.

The rectifiers 24 and 25 may be replaced by triacs 26 and 27 (FIG. 6) if the centrifugal switches are replaced by control circuits 28 and 29. A triac is a device which does not conduct in either direction unless a bias voltage is applied to a control terminal when it conducts in either direction depending on the polarity of bias or trigger signals applied. By applying control signals of both polarities alternately in synchronism with an a.c. signal a triac can be made to conduct in both directions.

A suitable circuit for connection between the points XX of FIG. 6 is shown in FIG. 7. Thus the control circuits 28 and 29 each consist of a rectifier 31 and a centrifugal switch 32. Before the switch 32 opens at just below synchronous speed control signals of both polarities reach the control terminal of the triac which therefore passes a.c. and starting is by induction-motor action. When the switch 32 opens, the rectifier 31 applies one polarity of control signal to the triac and the a.c. induced in the rotor winding is rectified.

A particularly suitable rotor winding control circuit for the motors of FIGS. 1 and 2 when running on a fixed frequency supply will now be described with reference to FIG. 8.

The rotor windings 18, 19 and 20 are wound as for a conventional induction motor but torque is low at starting if these windings are of low resistance. To overcome this problem series resistors 33, 34 and 35 respectively, are connected in series with the windings, but control circuits are provided to short circuit these resistors as speed increases. At low speeds centrifugal switches 36, 37 and 38 are open and triacs 39 and 40 do not receive control signals and do not conduct.

As speed rises the switches 36, 37 and 38 close, the resistor 34 is short circuited and the triacs 39 and 40 receive alternating voltages at their control terminals by way of centrifugal switches 42 and 43, respectively, which do not open until near synchronous speed has been reached. Consequently the triacs pass a.c. and the resistors 33 and 35 are also short circuited.

When synchronism is approached the switches 42 and 43 open and the triacs are controlled by rectifiers 44 and 45 so that they rectify currents induced in the windings 18 and 19. The motor now acts as a synchronous motor with a d.c. excited rotor. If desired the centrifugal switch 37 can be replaced by a control circuit of the type connected across the resistor 33, the triac and rectifier of this control circuit being oppositely poled with respect to the triacs 39 and 40, and the rectifiers 44 and 45.

A special form of rotor winding particularly devised for a motor having the stator core of FIG. 1 is shown in FIG. 9. In order to make best use of the flux pulsations of FIG. 2b the rotor carries a number of pick-up coils 46 one for each slot 11 on the stator. In FIG. 9 the stator 10 and part of the rotor 12 are shown in a developed view while the main winding 47, which is d.c. excited to provide the rotor poles, a bridge rectifier 48 and a capacitor 49 are shown schematically. The winding 47 may be distributed in slots on the rotor or it may consist of coils mounted on a salient pole rotor.

In general, the pick-up coils may have a coil-pitch approximately equal to half the stator slot pitch, or odd multiples of half the stator slot pitch. Such coils may be provided over the complete periphery of the rotor surface, not necessarily with uniform distribution, or they may be confined to selected portions of the rotor periphery.

The flux pulsations are superimposed on the main flux wave and their polarity is therefore influenced by it. Hence the pick-up coils are reverse connected where they are in the field of opposite poles, such a connection being shown by way of example at 51. If the arrangement of inter-connections is fixed to satisfy this requirement under no-load conditions, the no-load excitation will be a maximum. However, the axis of the main field shifts as the motor is loaded; it is therefore advantageous to set the interconnection of the pick-up coils with reference to the position of the main field under loaded conditions (say full-load or pull-out torque). This arrangement provides greater excitation under loaded conditions.

The pick-up winding is connected to the main excitation winding 47 on the rotor through the bridge rectifier 48.

The capacitor 49 is included to reduce the overall impedance presented by the pick-up coils 46, in other words they are to some extent "tuned" by the capacitor with a consequent increase in induced current. Thus the higher the frequency of the flux pulsations the smaller the capacitor used.

It is advantageous if the pick-up coils 46 are connected in series as shown. Unbalanced voltages arising due to non-uniform air-gap length or rotor eccentricity would tend to cause undesirable circulating currents in parallel-connected sets of coils.

A normal type of squirrel cage winding is provided for starting purposes. The arrangement of this winding is such that it does not reduce the flux pulsations in the vicinity of the pickup coils and also such that it does not carry excessive currents induced by the flux pulsations. The slots occupied by the squirrel cage may be confined to portions of the rotor periphery where there are no pick-up coils.

As has been mentioned an a.c. signal may be induced in the rotor winding by supplying the stator winding with non-sinusoidal supply, such as is commonly provided by d.c. to a.c. inverters or electronic commutators. Many such inverters are known and some examples of electronic commutators are described in "Electronic Commutation for Small Motors" by F.F. Mazda, Electrical Times, Sept. 17, 1971. Other suitable inverters are described in a paper L7127 "Solid State A.C. Motor Drives" by B.Moknytzki, published by Reliance Electric Company of Cleveland, Ohio, U.S.A.

Where a motor supplied from a non-sinusoidal source is to be started at full frequency its starting torque will be low owing to the low resistance of the rotor winding. However a rotor design which gives good starting torque is illustrated in FIG. 10.

A salient pole rotor 52 has a single axis main rotor winding 53 which is short circuited during starting. This winding may be controlled for example in the way described in connection with FIG. 4. The winding 53 experiences induced voltages from alternating fields parallel to the axis 54. To improve starting torque a further winding is provided on the axis 55, this winding consisting of nested coils constructed by joining conductors 56 at each end of the motor to form a single short circuit coil, and similarly joining conductors 57, the conductors 58, and the conductors 59 to form three more such coils. The conductors 57 to 59 may be insulated or uninsulated. For clarity only two coils are shown per pole but many more such nested coils may be provided. Thus it will be apparent that the longitudinal axis of the coils 56 and 57 (that is the axis parallel to the axis of rotation of the rotor) is half way, measured round the rotor periphery, betwen the longitudinal axes of the salient poles shown in FIG. 10.

The winding formed by the conductors 56 to 59 acts as a form of cage winding to produce starting and accelerating torque but once synchronous or near synchronous speed is reached this winding has no effect on the field inducing a.c. in the winding 53 or the axis 54 to be rectified to excite the rotor.

Where there are more than two poles one nest of short circuit coils is provided between each adjacent pair of poles and each nest is centered on an axis halfway, measured round the periphery, between the longitudinal axes of the adjacent poles.

One advantage of using an inverter with a non-sinusoidal output as a supply is that the speed of the motor can be varied by varying the supply frequency. A suitable circuit for controlling the rotor winding in this situation is shown in FIGS. 6 and 11, where the circuit of FIG. 11 replaces that part of the circuit of FIG. 6 between the points X X. The triac conducts during half cycles of one polarity of voltages in the rotor windings at all rotor speeds due to the action of a diode 62. During starting the voltage across the winding 18 or that across the winding 19 due to the fundamental stator field is large, and hence the voltage across the triac is comparatively high. This voltage is rectified by a bridge rectificer 63 and smoothed by a capacitor 64. The smoothed voltage charges a capacitor 65 through a resistor 66 and if the voltage across the capacitor 65 in any half cycle of the induced voltage in the rotor windings reaches a predetermined value a diac 67 conducts. A diac is a two terminal device which conducts only if the applied voltage exceeds a predetermined voltage. It will then conduct in the direction corresponding to the applied voltage. The capacitor 65 is then discharged through the primary winding of a transformer 68 whose secondary winding is connected to the control terminal of the triac. The resulting pulse in the transformer secondary causes the triac to conduct for that half cycle and as a result the triac conducts in both directions.

When the motor is near synchronous speed the voltage due to the fundamental field across the rectifier 63 is small and consequently the voltage across the capacitor 65 leaks away in each half cycle of induced voltage before rising sufficiently to cause the diac 67 to conduct. The triac is therefore controlled solely by the rectifier 62 and acts as a rectifier.

A relatively high voltage due to the harmonic field is also, of course, induced in the rotor winding and it is this voltage when rectified which supplies the rotor at synchronous speed. The diode 62 allows the triac to rectify half cycles of one polarity of this voltage, but the time constant of the capacitor 65 and the resistor 66 in relation to the frequency of the harmonic field as applied to the rotor is such that the voltage across the capacitor 65 does not rise sufficiently to allow the diac 67 to conduct, and hence the triac rectifies under the control of the recifier 62.

Instead, also for a motor supplied from a variable frequency supply, the improved rotor control circuit of FIG. 12 may be used.

As in FIG. 11 rectifiers 70 and 71, connected by way of resistors 72 and 73, respectively, to the control terminals of triacs 26 and 27 allow the triacs, at all rotor speeds, to pass half cycles of one polarity of voltages induced by both the fundamental and harmonic stator fields.

During starting the voltage induced in the windings 18 and 19 by the fundamental rotor field is high, and therefore during half cycles of the other polarity capacitors 74 and 75 charge through resistors 76 and 77. When the voltages across the capacitors 74 and 75 charge through resistors 76 and 77. When the voltages across the capacitors 74 and 75 reach a predetermined level zener diodes 78 and 79, and 81 and 82 conduct allowing the triacs 26 and 27 to conduct for that half cycle. The capacitors are discharged when the triacs conduct under the action of the rectifiers 70 and 71.

The time constants of the resistor and capacitor combinations 76 and 74, 77 and 75, and the voltages at which the zener diode pairs 78, 79 and 81, 82 conduct are such that when the motor approaches synchronous speed at a predetermined supply frequency, the voltages reached across the capacitors 74 and 75, due to the fundamental stator field, are not sufficient to cause the zener diode pairs to conduct. Hence the triacs rectify under the control of the rectifiers 70 and 71.

The above mentioned time constants are also such that voltages, due to the harmonic stator fields, across the capacitors 74 and 75 do not reach the zener voltages in any half cycle and again the triacs rectify such induced voltages.

Having reached synchronism at the predetermined supply frequency, for example 13Hz, the speed of the motor can be raised or lowered in synchronism over a range, for example 13 to 50Hz, by changing the output frequency of the inverter.

For a 5KW, four pole motor, supplied at 220 volts line to line working at the speeds mentioned above, the following component values may be used:

Resistors 72 and 73 — 200 Ohms
Resistors 76 and 77 — 1,000 Ohms
Capacitors 74 and 75 — 100 micro-farads The zener diodes may be type BZY 88 C5V1 made by Mullard, and the triacs may be type 2N5445 made by R.C.A.

Any of the above motors may be used in a circuit which will now be described having characteristics similar to those of a series motor, although as will be explained special starting arrangements many of which are described above are not required.

In FIG. 13 a d.c. to a.c. converter 83 with d.c. input and a square waveform output provides a variable frequency three-phase a.c. supply for a stator 84 of a motor. The motor is shown as three-phase but any other practical number of phases may be used. The position of a rotor 85 of the motor is signalled during each revolution by a rotor-position detector 86, which may for example be a known detector which utilizes a mark on, or part of, the rotor which influences a pick up in the form of a photo-sensitive device or coil each time the mark or part passes the pick-up as the rotor rotates. In this way output pulses are generated by the detector 86 on each such occasion. These pulses, indicating the position of the rotor at a certain time, are passed to control the firing of switching devices such as thyristors in the inverter 83. There are many known inverters, such as that mentioned above and described by F. Mazda which may be used.

If a synthronous motor operates with constant alternating applied voltage V and constant d.c. field excitation $I_f$, and if the frequency $f$ of the a.c. supply is varied as a function of rotor position to hold the rotor load angle $\delta$ (that is the angle by which the rotor lags the stator field during rotation) constant, then $$\phi = kV/f$$

where $\phi$ is the stator air-gap flux.

That is, $\phi$ is high at low speeds (low $f$) and low at high speeds, as for a d.c. series motor.

Let $X_{so}$ be synchronous reactance at a base frequency $f_o$

At frequency $f$, output power $P = V E \sin\delta/X$ which is proportional to $V(I_fN) \sin\delta/X_{xad}f/f_o\, f_o$ where N is rotor speed, and is proportional to $f$.

Hence, under the above conditions, P is a constant.

Torque $T = P/2\pi N$

∴ T is inversely proportional to speed N, which gives a series motor characteristic.

Alternatively, torque may be viewed as the interaction of stator flux and rotor excitation current:

$T = k_1\phi\, I_f \sin\delta$
$= k\, (V/f)\, I_f \sin\delta$ which again shows that torque is inversely proportional to $f$ or $N$.

In Fig. 13, controlling the firing of switching devices in the inverter 83 from the position detector 86 ensures that the load angle δ is held constant. Hence the advantages of a series-motor characteristic are obtained with a brushless machine.

Torque control means 87 may be used to delay the application of signals to the inverter 83 and thus control the torque provided by the motor. The torque control means may be a variable delay circuit, such as a controllable shift register, or means for moving the angular position of the detector 86 in either direction with respect to the stator.

Measured characteristics for a motor controlled in the way described in connection with FIG. 13 are shown in FIG. 14, where $N_n$ and $T_n$ are normalized values for rotor speed and torque respectively. The angles given are rotor load angles δ.

The arrangement of FIG. 13 is capable of operating from a supply which varies from d.c. (zero frequency) up to high frequency. There are no synchronization or starting problems since the frequency of the stator voltages is always matched to the motor speed.

In carrying out the invention, many variations of the above specifically described embodiments will be apparent. For example often delta-connected windings may be used where star-connected windings are illustrated. Further where triacs are used they may be replaced by any other type of bi-directional selective rectifying element with modification to the circuit concerned if necessary. In this Specification the term bi-directional selective rectifying element means a device which will only pass current in one direction after a first control signal is applied and will only pass current in the other direction after a second control signal is applied. Such elements include triacs and parallel connected pairs of oppositely poled semiconductor controlled rectifiers such as thyristors.

We claim:

1. A combination including alternating current supply means which in addition to a fundamental output frequency provides at least one output at a harmonic of the fundamental, an electric machine comprising a stator having a stator winding coupled to the alternating current supply means to provide a rotating magnetic field with a main component field, having a predetermined number of poles due to the fundamental output of the said alternating current supply, and a subsidiary component field due to the harmonic output of the said supply means, a rotor located to rotate about the axis of rotation of the said magnetic field and having a winding providing the predetermined number of poles when excited by direct current, rectifier means mounted on the rotor for rectifying currents induced in the rotor winding by the subsidiary component magnetic field, and control means for allowing alternating currents to flow in the rotor winding when the speed of rotation of the rotor is less than a predetermined speed.

2. A machine according to claim 1, wherein the air gap between the rotor and the stator is between 0.040 inches and 0.1 inches.

3. A machine according to claim 1, wherein the rotor winding is would to provide a plurality of poles when excited by direct current, and the rotor includes a number of starting windings, one associated with each adjacent pair of poles, each starting winding comprising a number of short circuit coils positioned in the periphery of the rotor with the longitudinal axis of each coil substantially half way, measured round the rotor periphery, between the longitudinal axes of the associated poles.

4. A machine according to claim 1, wherein the rotor winding is a single phase winding, the rectifier means comprises a half-wave rectifier connected in series with the rotor winding, and the control means is a centrifugal switch mounted on the rotor and connected in parallel with the rotor winding and the rectifier, the centrifugal switch being closed at low rotor speeds to short circuit the rectifier but opening above the predetermined speed.

5. A machine according to claim 1, wherein that rotor winding is a multi-phase star connected winding, the rectifier means comprises a number of half-wave rectifiers one for at least each phase of the multi-phase winding except one, each rectifier being connected in series with one phase of the star connected winding individual thereto, and the rectifiers being poled to allow a direct current to flow in the star connected winding, and the control means includes a number of centrifugal switches, one for and connected in parallel with, each rectifier, the centrifugal switches being closed at low rotor speeds to short-circuit the rectifiers but opening above the predetermined speed.

6. A machine according to claim 1, wherein the rotor winding is a three-phase delta connected winding and the rectifier means comprises two half-wave rectifiers and two centrifugal switches adapted to close at low rotor speeds and to open above the predetermined speed, each rectifier being connected in parallel with one centrifugal switch and with one associated phase of the delta winding, the other phase being short-circuited and the two rectifiers both being poled to conduct towards the junction of their associated phases or both being poled to conduct away from the said junction.

7. A machine according to claim 1, wherein the rotor winding is a multi-phase star connected winding, the rectifier means comprises a number of bi-directional selective rectifying elements as hereinbefore specified, one for at least each phase of the star connected winding except one, each element having two current terminals and at least one control terminal, each element being connected in series by means of its current terminals with one phase of the star connected winding individual thereto, and the control means includes a number of control circuits for providing control signals causing the elements to conduct in both directions up to and including the predetermined speed, and to conduct only in one direction that direction being such that direct current flows in the star connected winding, above the predetermined speed, one control circuit being associated with each element.

8. A machine according to claim 7, including a number of resistors, one for and connected in parallel with the current terminals of each element, and wherein each control circuit comprises means for causing the element to conduct in one direction only above a further predetermined rotor speed, and means for causing the element to conduct in the other direction also when the rotor speed is above the further predetermined speed but not greater than the first mentioned predetermined speed, the machine also including a further resistor connected in series with any phase of the star connected winding which is not connected in series with an element individual thereto, means being provided for short circuiting the further resistor when the rotor speed exceeds the first mentioned predetermined speed.

9. A machine according to claim 8, wherein the elements are triacs, the means in each control circuit for causing the associated triac to conduct in one direction only includes a first centrifugal switch connected in series with half-wave rectifier between one current terminal and the control terminal of the triac, and the means for causing the triac to conduct in the other direction includes a second centrifugal switch connected in parallel with the rectifier, the first switch being open unless the further predetermined speed is exceeded, and the second switch being closed unless the first mentioned predetermined speed is exceeded.

10. A machine according to claim 7, wherein each control circuit includes means for causing the element to conduct in one direction only at all rotor speeds, a resistance-capacitance network and trigger means which conducts when the voltage across a capacitor in the network exceeds a predetermined voltage, the trigger means being coupled to the or one of the control terminals of the element to cause the element to conduct in the other direction when the trigger means conducts, and the time constants of the resistance capacitance network being such that the predetermined voltage is not reached due to any voltages induced in the rotor windings, when the predetermined rotor speed is exceeded.

11. A machine according to claim 10, wherein the elements are triacs, the means in each control circuit for causing the element to conduct in one direction is a half-wave rectifier connected between one current terminal and the control terminal of the associated triac, and the resistance-capacitance network includes a full-wave rectifier connected across the current terminals of the associated triac, a resistor connected in series with the capacitor across the direct current output of the full-wave rectifier and a diac connected in series with the primary winding of a transformer across the capacitor, the secondary winding of the transformer being connected in parallel with the half-wave rectifier.

12. A machine according to claim 10, wherein the elements are triacs, the means in each control circuit for causing the element to conduct in one direction is a half-wave rectifier connected between one current terminal and the control terminal of the associated triac, and the resistance-capacitance network includes a resistor connected in series with the capacitor between the current terminals of the associated triac, and a pair of zener diodes connected in series between the junction of the capacitor and the resistor and the control terminal of the associated triac, the zener diodes being connected with like electrodes adjacent.

13. A combination including:
a variable frequency alternating current supply means adapted to provide each cycle of its output in response to, and in fixed time relationship with, a trigger signal;
an electric machine comprising:
a stator having a stator winding coupled to the alternating current supply means to provide a rotating magnetic field with a main component field having a predetermined number of poles;
a rotor, separated from the stator by an air gap, located to rotate about the axis of rotation of the said magnetic field and having a winding providing the predetermined number of poles when excited by direct current;
the radial length of the air gap between the stator and the rotor varying with angular position of the magnetic field and causing a subsidiary field component to be derived, the subsidiary component inducing currents in the rotor winding at least when the rotor rotates at the same speed as the main component field; and
rectifier means mounted on the rotor for causing direct currents to flow in the rotor winding by rectifying currents induced in the rotor winding;
the combination also including:
position detector means for providing a signal indicative, at least periodically, of the angular position of the rotor; and
means for providing the trigger signal for the alternating current supply periodically at times predetermined by the signal from the position detector means.

14. A machine according to claim 13, wherein the inner periphery of the stator is divided into portions, and the air gaps between the stator and the rotor are different for adjacent portions, the portions are divided into pairs, and the portions of each pair have equal air gaps and are positioned diametrically opposite one another relative to the said axis.

15. A machine according to claim 14, wherein the air gaps are of two predetermined sizes only, the larger air gaps having a radial dimension which is between two and twenty five times the radial dimension of the smaller air gaps.

16. A combination according to claim 13, wherein the position detector means provides a position signal each time the rotor is in a predetermined position, and the means for providing the trigger signal includes a variable delay circuit coupled between the position detector and the supply to vary the time relationship between the position signal and the trigger signal.

17. A combination including:
a variable frequency alternating current supply means adapted to provide each cycle of its output in response to, and in fixed time relationship with, a trigger signal;
an electric machine comprising:
a stator having a stator winding coupled to the alternating current supply means to provide a rotating magnetic field with a main component field having a predetermined number of poles;
a rotor, separated from the stator by an air gap, located to rotate about the axis of rotation of the said magnetic field and having first and second windings, the first winding providing the predetermined number of poles when excited by direct current;

the radial length of the air gap between the stator and the rotor varying with the angular position of the rotating magnetic field and causing a subsidiary field component to be derived, the subsidiary component inducing currents in the second rotor winding at least when the rotor rotates at the same speed as the main component field; and rectifier means mounted on the rotor for causing direct current to flow in the first rotor winding by rectifying currents induced in the second rotor winding;

the combination also including;

position detector means for providing a signal indicative, at least peridoically, of the angular position of the rotor; and means for providing the trigger signal for the alternating current supply periodically at times determined by the signal from the position detector means;

18. A machine according to claim 17, wherein the stator includes a core of magnetic material defining a cylindrical space for the rotor, and the stator winding includes conductors positioned in axial slots along the inner periphery of the stator core.

19. A machine according to claim 18, wherein the ratio of the width of each slot to the length of the air gap between the rotor and the stator is in the range seven to 20.

20. A machine according to claim 18, wherein the second rotor winding includes a number of axially elongated coils, the dimension transverse to the rotor axis of each coil being substantially equal to half the stator slot pitch or odd multiples of half the stator slot pitch, the coils being so connected that at least under some operating condition currents induced by the variation of stator flux are additive.

21. A combination including:

a variable frequency alternating current supply means which in addition to a fundamental output frequency provides at least one output at a harmonic of the fundamental, the alternating current supply being adapted to provide each cycle of its fundamental output in response to, and in fixed time relationship with, a trigger signal;

an electric machine comprising:

a stator having a stator winding coupled to the alternating current supply means to provide a rotating magnetic field with a main component field, having a predetermined number of poles, due to the fundamental output of the said alternating current supply and a subsidiary component field due to the harmonic output of the said supply means;

a rotor located to rotate about the axes of rotation of the said magnetic field and having a winding providing the predetermined number of poles when excited by direct current;

rectifier means mounted on the rotor for causing direct currents to flow in the rotor winding by rectifying currents induced in the rotor winding by the subsidiary component magnetic field;

the combination also including:

position-detector means for providing a signal indicative, at least periodically, of the angular position of the rotor; and means for providing the trigger signal for the alternating current supply periodically at times determined by the signal from the position detector means.

22. A combination according to claim 21, wherein the position-detector means provides a position signal each time the rotor is in a predetermined position, and the means for providing the trigger signal includes a variable delay circuit coupled between the position detector and the supply to vary the time relationship between the position signal and the trigger signal.

23. A combination including alternating current supply means which in addition to a fundamental output frequency provides at least one output at a harmonic of the fundamental, an electric machine comprising a stator having a stator winding coupled to the alternating current supply means to provide a rotating magnetic field with a main component field, having a predetermined number of poles due to the fundamental output of the said alternating current supply, and a subsidiary component field due to the harmonic output of the said supply means, a rotor located to rotate about the axis of rotation of the saig magnetic field and having first and second windings, the first winding providing the predetermined number of poles when excited by direct current, rectifier means mounted on the rotor for rectifying currents induced in the second rotor winding by the subsidiary component magnetic field and supplying the resultant direct currents to the first rotor winding, and control means for allowing alternating currents to flow in the first rotor winding when the speed of the rotor is less than a predetermined speed.

24. A combination including:

a variable frequency alternating current supply means which in addition to a fundamental output frequency provides at least one output at a harmonic of the fundamental, the alternating current supply being adapted to provide each cycle of its fundamental output in response to, and in fixed time relationship with, a trigger signal;

an electric machine comprising:

a stator having a stator winding coupled to the alternating current supply means to provide a rotating magnetic field with a main component field, having a predetermined number of poles, due to the fundamental output of the said alternating current supply and a subsidiary component field due to the hamronic output of the said supply means;

a rotor located to rotate about the axis of rotation of the said magnetic field and having first and second windings, the first winding providing the predetermined number of poles when excited by direct current;

rectifier means mounted on the rotor for causing direct currents to flow in the first rotor winding by rectifying currents induced in the second rotor winding by the subsidiary component magnetic field;

the combination also including:

position detector means for providing a signal indicative, at least periodically, of the angular position of the rotor; and means for providing the trigger signal for the alternating current supply periodically at times determined by the signal from the position detector means.

* * * * *